UNITED STATES PATENT OFFICE.

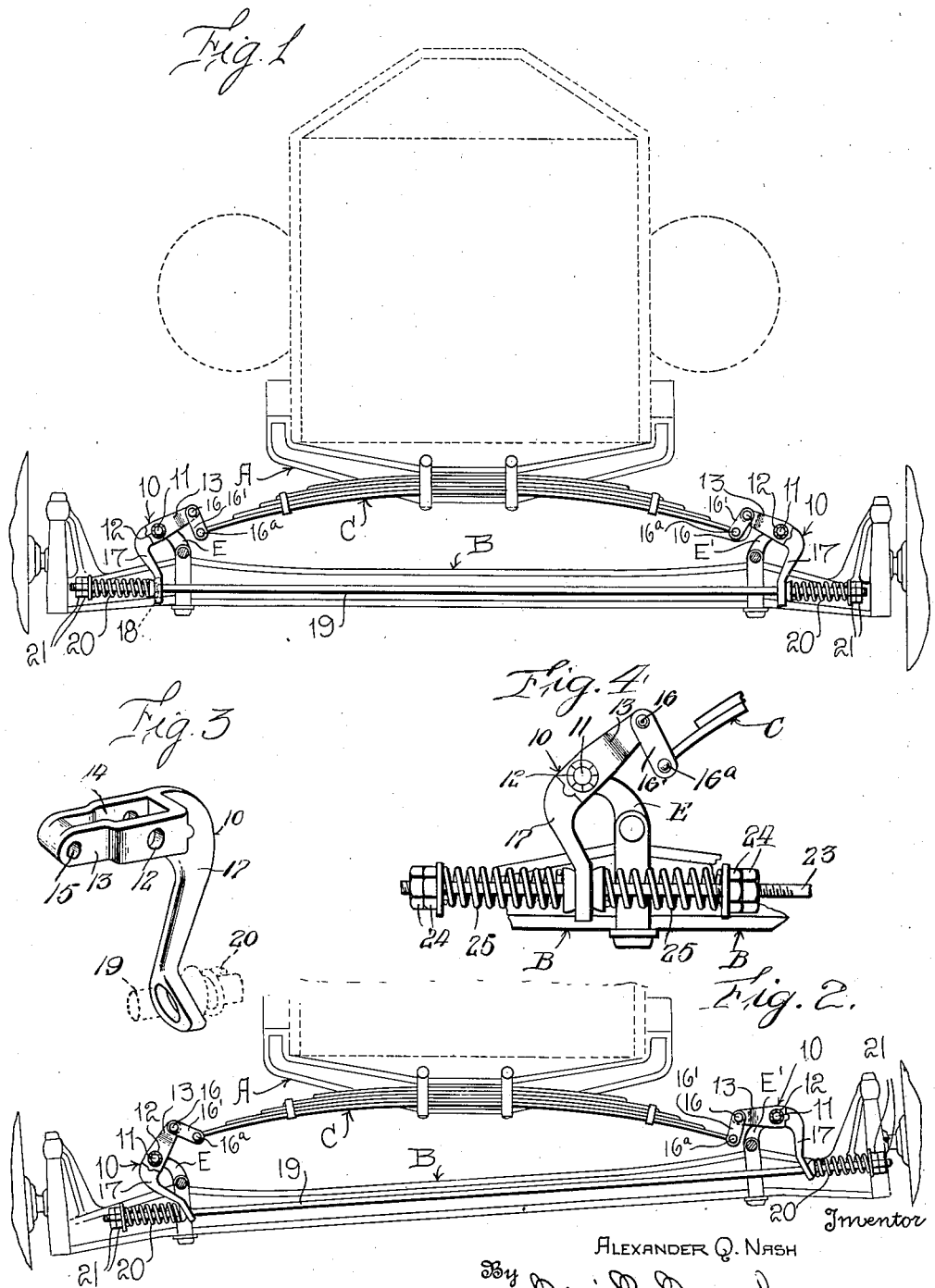

ALEXANDER Q. NASH, OF KANSAS CITY, MISSOURI.

SPRING SYSTEM FOR VEHICLES.

1,325,489.   Specification of Letters Patent.   Patented Dec. 16, 1919.

Application filed February 11, 1918. Serial No. 216,630.

*To all whom it may concern:*

Be it known that I, ALEXANDER Q. NASH, a citizen of the United States, residing at 2626 Benton Boulevard, Kansas City, in the county of Jackson and State of Missouri, have invented certain new and useful Improvements in Spring Systems for Vehicles, of which the following is a specification.

My invention relates to improvements in spring systems for vehicles in general and more particularly for motor driven vehicles. It has for its general object to provide a simple, inexpensive and efficient device which is applicable to all vehicles using parti-elliptic spring construction for accomplishing the functions of body leveling and checking both excessive depression and recoil of the normal spring of the vehicle during travel under abnormal road conditions.

In the drawings, wherein I have shown an embodiment of my invention as adapted to a "Ford" car:

Figure 1 is a rear elevation of a Ford car equipped with my invention;

Fig. 2 is a rear elevation showing the operation of the device;

Fig. 3 is a view, in perspective, of one of the bell crank levers;

Fig. 4 is a fragmentary elevation of a modified construction.

In numerous makes of motor vehicles, of which the Ford may be taken as an example, the body frame—represented in the drawings at A—is connected to proximate running gear members such as the front and rear axles, the former of which is shown in the drawing and is designated as B (though the device is equally applicable to both axles mentioned) by a parti-elliptical leaf spring C of the platform type, the extremities of which are usually underslung on links depending from appropriate brackets E and E' carried on the running gear of the vehicle.

In the construction illustrated wherein each corner of the body is supported by a quarter elliptic spring, so to speak, paralleling the contiguous axle, a shock tending to cause relative approach between the running gear and frame elongates the span of the parti-elliptic spring member, causing the spring extremities to move outwardly under the spring stress. This outward movement of the spring ends is usually taken up directly in the shackles connecting the spring ends with the brackets E and E'.

However, this arrangement is disadvantageous in that, in striking obstacles with the wheels and in riding over rough roads the body of the vehicle tilts from side to side and also the full benefit of the springs is not obtained and considerable discomfort is caused the passengers due to the sharp angles of tilt which the vehicle assumes and the rapid depression and recoil of the springs.

The particular constructions shown in Figs. 1 to 4 inclusive overcome the disadvantages above mentioned and provide a supplementary spring system constructed on the principle of a lever of the first class and acting in conjunction with the ends of the parti-elliptic springs to reduce the rate of movement of the body during either depression or recoil of the springs or both, and also maintain the body level during travel over rough roads.

In the construction illustrated:

The frame A carries the usual transverse parti-elliptic spring C and the axle B is provided with the brackets E and E', which are usual with the Ford construction and are merely reversed in position. However, the usual shackles are replaced by bell crank levers 10 pivoted to said brackets E and E' by pins 11 through holes 12 in said levers. Each bell crank lever 10 has a short arm 13 cut-out as shown at 14 and drilled at 15 to receive a pin 16 serving to couple the bell crank levers to the spring ends by means of shackles 16' and pins 16ª. The long arms 17 of the bell crank levers are provided with elongated cut-outs as shown at 18 and a floating rod 19 extends through these slots and carries, on each end, a spring 20 said springs being held in place and adjustable as to tension by nuts 21 threaded on said rod. Washers are placed at each end of each spring as shown, those at the adjacent ends of the springs having spherical bearing surfaces seating in the elongated cut-outs 18 above mentioned.

The operation of this device is clearly set out in Fig. 2 and, as will be evident, is on the principle of a lever of the first class and it not only controls and checks the depression, but also maintains the body level no matter what position the axle B may assume during travel over a rough road.

In Fig. 4 the construction is the same as that just previously described except that the floating rod here designated as 23 is threaded to receive nuts 24 on each side of each bell crank lever arm 17 and also springs 25 on each side thereof, thereby controlling both depression and recoil.

While, in the foregoing, I have described my invention only as applied to the front axle, it is to be understood that it may be applied to the rear axle also and its principle may also be applied to springs set in any position other than transverse of the vehicle. It is also to be understood that in practising the invention such modifications may be resorted to as fall within the scope of the appended claims.

I claim:

1. In combination with a vehicle comprising a body frame and a running gear, an interposed parti-elliptic spring structure adapted for elongation of its span when the body frame and running gear approach each other, of a pair of bell-crank levers fulcrumed on said running gear and each having one arm thereof connected with the respective ends of said spring structure, rigid means in a plane substantially parallel with the parti-elliptic spring and extending between and connected to the remaining arms of the bell-crank levers, and spring check means carried by the last named means and opposing movement of both bell-crank levers with respect to said rigid means.

2. In combination with a vehicle comprising a body frame and a running gear, an interposed parti-elliptic spring structure adapted for elongation of its span when the body frame and running gear approach each other, of a pair of bell crank levers fulcrumed on said running gear and each having one arm thereof connected with the respective ends of said spring structure, the remaining bell crank arms having slots, a floating rod in a plane substantially parallel with the parti-elliptic spring and extending between said last mentioned arms, and yielding check means carried by said rod and opposing movement of both bell crank levers with respect to said rod.

3. In combination with a vehicle comprising a body frame and a running gear, an interposed parti-elliptic spring structure adapted for elongation of its span when the body frame and running gear approach each other, of a pair of bell crank levers fulcrumed on said running gear and each having one arm thereof connected with the respective ends of said spring structure, the remaining bell crank arms having slots, a floating rod in a plane substantially parallel with the parti-elliptic spring and extending between said last-mentioned arms, and spring check means carried by said rod and opposing movement of both bell crank levers with respect to said rod only during depression of said spring structure.

4. In combination with a vehicle comprising a body frame and a running gear, an interposed parti-elliptic spring structure adapted for elongation of its span when the body frame and running gear approach each other, of a pair of bell crank levers fulcrumed on said running gear and each having one arm thereof connected with the respective ends of said spring structure, the remaining bell crank arms having slots, a floating rod in a plane substantially parallel with the parti-elliptic spring and extending between said last mentioned arms, yielding check means carried by said rod and opposing movement of both bell crank levers with respect to said rod during recoil of said spring structure, and other yielding spring check means opposing movement of the bell crank levers during depression of said spring structure.

5. In combination with a vehicle comprising a body frame and a running gear, an interposed parti-elliptic spring structure adapted for elongation of its span when the body frame and running gear approach each other, of a pair of bell crank levers fulcrumed on said running gear and each having one arm thereof connected with the respective ends of said spring structure, the remaining bell crank arms having slots, a floating rod in a plane substantially parallel with the parti-elliptic spring and extending between said last mentioned arms, and yielding check means carried by said rod and opposing movement of both bell crank levers with respect to said rod only during depression of said spring structure.

6. In combination with a vehicle comprising a body frame and a running gear, an interposed parti-elliptic spring structure adapted for elongation of its span when the body frame and running gear approach each other, of a pair of bell crank levers fulcrumed on said running gear and each having one arm thereof connected with the respective ends of said spring structure, the remaining bell crank arms having slots, a floating rod in a plane substantially parallel with the parti-elliptic spring and extending between said last-mentioned arms, and yielding check means carried by said rod and opposing movement of both bell crank levers with respect to said rod during both depression and recoil of said spring structure.

7. In combination with a vehicle frame and axle, a spring system having bell crank levers fulcrumed on the axle and each having one arm connected with the vehicle frame, a rod extending between the remaining bell crank arms and in a plane approximately parallel with the axle and carrying spring means opposing movement of the bell crank levers.

In testimony whereof I affix my signature.

ALEXANDER Q. NASH.